United States Patent [19]
Horowitz et al.

[11] Patent Number: 6,046,748
[45] Date of Patent: Apr. 4, 2000

[54] COOPERATIVE FILTER AND RASTER OPERATION EVALUATION MODEL

[75] Inventors: Jeff Horowitz, Sherman Oaks; Ken Schmidt, Torrance, both of Calif.

[73] Assignee: Peerless Systems Corporation, El Segundo, Calif.

[21] Appl. No.: 08/671,450

[22] Filed: Jun. 27, 1996

[51] Int. Cl.[7] .................................................. G06T 11/00
[52] U.S. Cl. ............................................................ 345/431
[58] Field of Search ...................................... 395/128–133; 345/428–433

[56] References Cited

U.S. PATENT DOCUMENTS 5,502,804  3/1996  Butterfield ........................... 395/116 X

FOREIGN PATENT DOCUMENTS

| | | |
|---|---|---|
| 0459711A2 | 12/1991 | European Pat. Off. . |
| 0465250A2 | 1/1992 | European Pat. Off. . |
| 0568361A2 | 11/1993 | European Pat. Off. . |
| 0703550A2 | 3/1996 | European Pat. Off. . |

*Primary Examiner*—Almis R. Jankus
*Attorney, Agent, or Firm*—Blakely Sokoloff Taylor & Zafman

[57] ABSTRACT

A method and apparatus for handling transparency operatives simultaneously with raster operatives in a graphics environment. This is achieved by introducing filter operations to obtain the effect of transparency. Filter operations work cooperatively with grayscale and continuous-tone color raster operations. The introduction of filter operations, and their cooperation with raster operations allows this otherwise computationally complex problem to be served by a single hardware circuit for use in real-time applications such as monochrome and color laser printing. The solution is also applicable to displaying complex graphics on a video display device. A suitable apparatus receives graphics language commands which define the image to be displayed and generates a set of graphics orders from the graphics language commands representing the image to be displayed. The apparatus includes an image generator for generating a bitmap image from the graphics orders. A raster operation model is used for processing multiple-bit pixels in a source, in a pattern and in a destination, and a filter operation model is used for processing multiple-bit pixels in the source, pattern and destination. The raster operation model and the filter operation model operate cooperatively to modify the destination.

14 Claims, 5 Drawing Sheets

COOPERATIVE FILTER AND RASTER OPERATION EVALUATION MODEL

BACKGROUND OF THE INVENTION

The invention is in the field of display technology and deals specifically with processing color and gray scale data which is to be sent to a color or gray scale monitor or to a color laser printer or other continuous raster scan device using a novel mechanism for handling complex graphics operatives. The invention is part of the continuing evolution of software and hardware graphics and memory reduction technology to enable the printing and display of complex graphics images using less memory than would be the case without using the invented techniques.

The invention specifically addresses complex logic applied to continuous-tone data using new operatives called filter operations.

SUMMARY OF THE INVENTION

A novel approach to handling transparency operatives simultaneously with raster operatives in a graphics environment is disclosed. This is achieved by introducing filter operations to obtain the effect of transparency. Filter operations work cooperatively with grayscale and continuous-tone color raster operations. The introduction of filter operations, and their cooperation with raster operations allows this otherwise computationally complex problem to be served by a single hardware circuit. The efficiency of this approach lends itself well to real-time applications such as monochrome and color laser printing. The solution is also applicable to displaying complex graphics on a video display device.

This description first introduces raster operations and transparency. This is followed by a discussion of the difficulties of prior art approaches to solving the problem of combining these two mechanisms. Treating transparency as a filtration process allows a different view of this problem. The invention introduces and demonstrates this filtration process. Although this solution is efficient in software, it also lends itself well to hardware parallelism, hence eliminating the step-by-step or sequential computational process which the prior art approach imposes. This solution is described and a high-level circuit diagram that demonstrates the ability to achieve the cooperative result using parallel computation is shown.

DETAILED DESCRIPTION OF THE INVENTION

Figure 1:
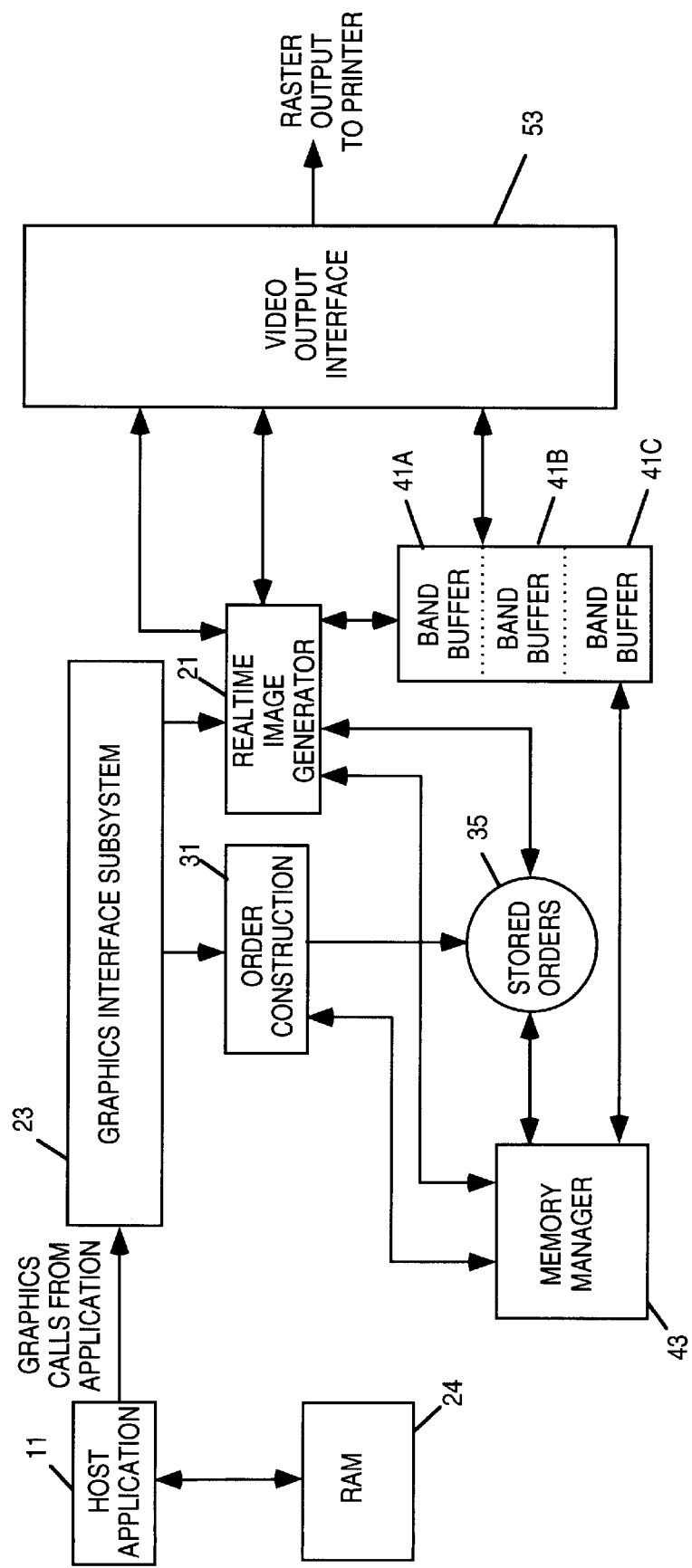
FIG. 1 is a block diagram of a system showing the environment in which the present invention may be used.
Figure 2:
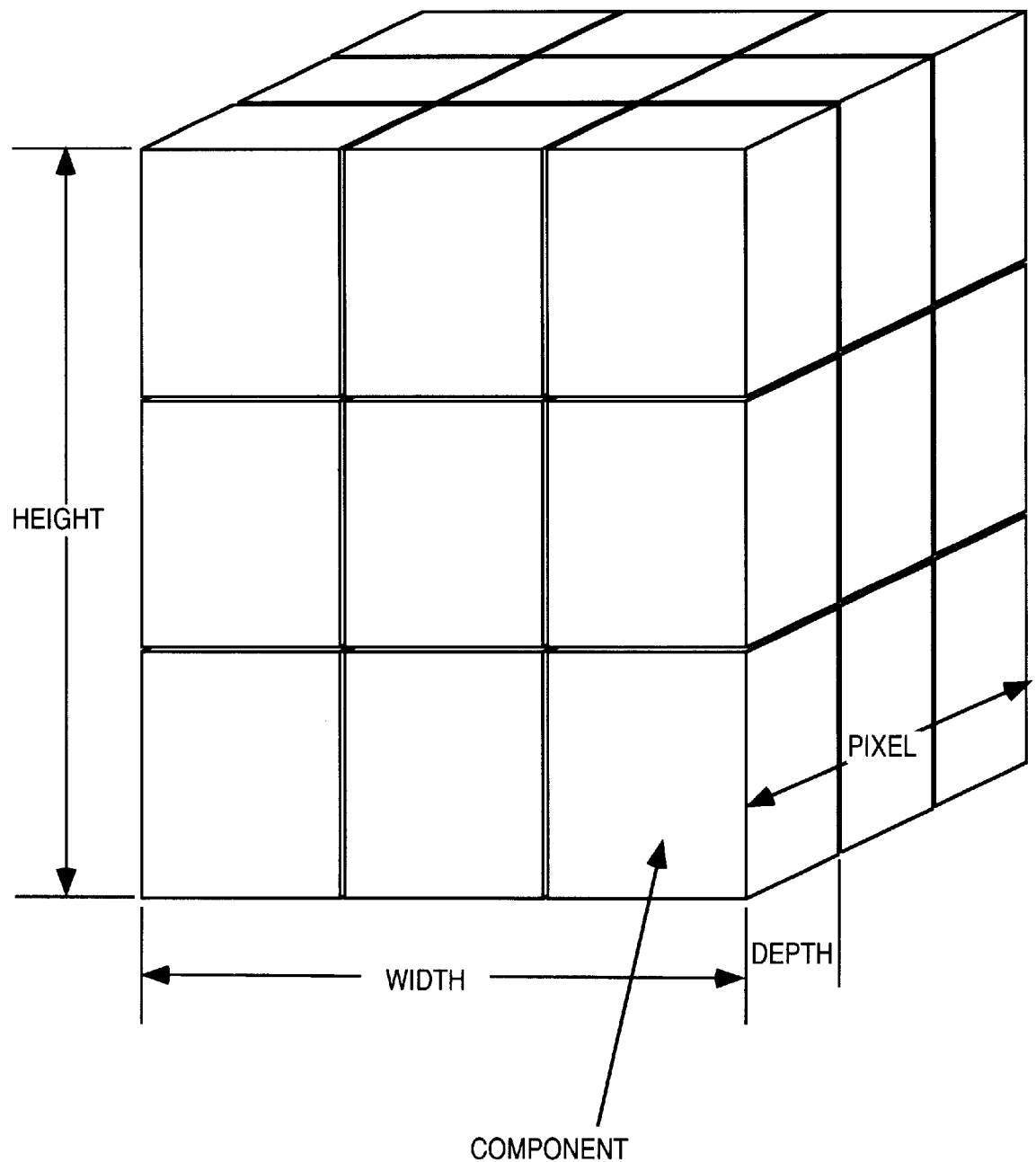
FIG. 2 is a representation of pixels forming a rectangular grid.
Figure 4:
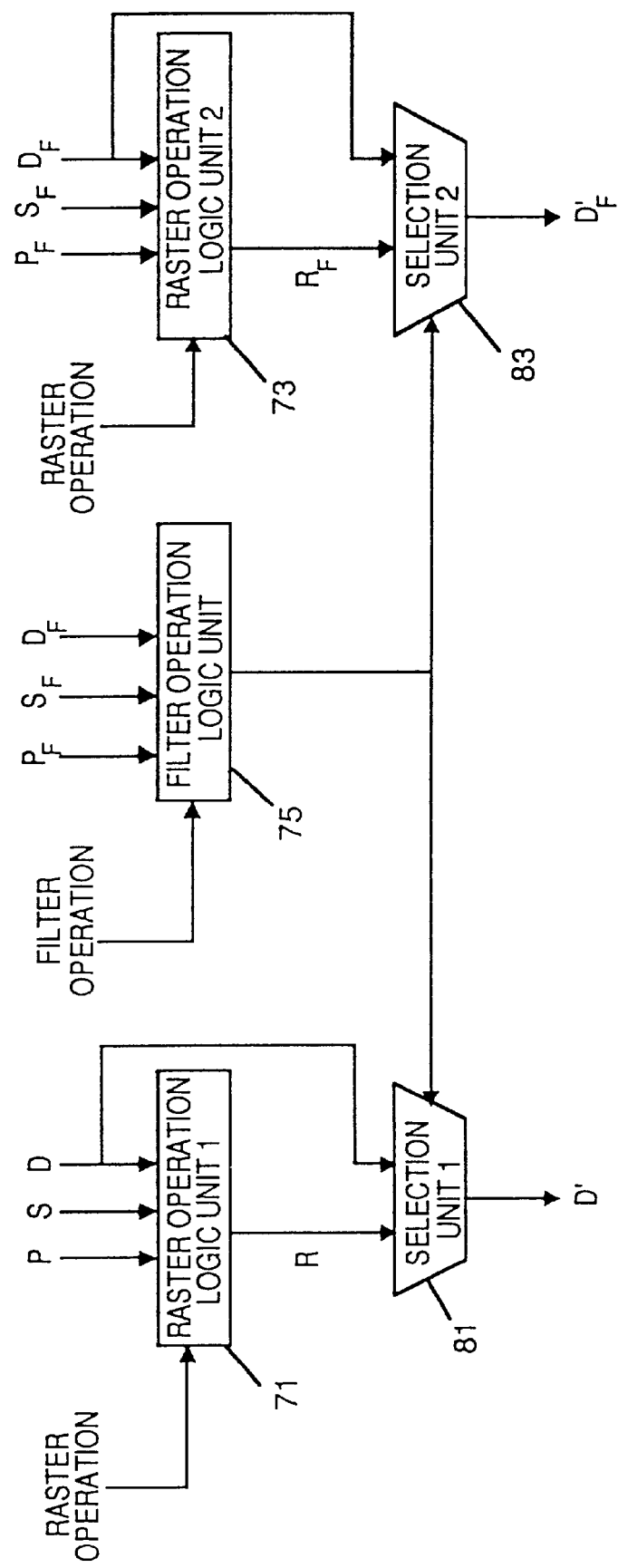
FIG. 4 is a block diagram of a circuit for implementing the cooperative evaluation algorithm described in FIG. 3 for three operands.

FIG. 1 is a block diagram of a system showing the environment in which the present invention may be used. In U.S. Pat. No. 5,204,804, a method and apparatus for generating graphics information for display on a continuous synchronous raster output device is disclosed. The system is shown in FIG. 4 of U.S. Pat. No. 5,204,804 and is for printing on monochrome output devices. The present invention is directed to improvements in the system described in U.S. Pat. No. 5,204,804 to handle color images as well as monochrome images. The basic graphics orders described in U.S. Pat. No. 5,204,804 are enhanced to support color and additional orders are defined for filters and other operations as described below. In this connection, as fully explained in U.S. Pat. No. 5,204,804, an image which is generated by a computer program, when it is being processed for display or printing is represented by generated commands that draw pixels which correspond to the image to be displayed or printed. In the invention described in U.S. Pat. No. 5,204,804, unlike the prior art, these commands are converted to graphics orders rather than directly to bitmaps. The graphics orders take up much less memory than corresponding bitmaps, but can be converted to bitmaps for sending to a continuous synchronous raster output device such as a laser printer at a speed fast enough to keep up with the print engine. FIG. 1 herein is similar to FIG. 4 of U.S. Pat. No. 5,204,804. However, in FIG. 1 herein, not all of the functional blocks shown in FIG. 4 appear as such blocks are not needed for an understanding of the present invention which relates mostly to improvements in the realtime blit processor 37 of FIG. 4 which is designated as realtime image generator 21 in FIG. 1.

Functionally, the enhancements to the basic orders described in U.S. Pat. No. 5,204,804 and additional orders defined for filters and other operations needed for operation of the present invention provide transparency information to realtime blit processor 37, also referred to as the graphics execution unit (GEU) in U.S. Pat. No. 5,204,804. This includes the following information (1) a two operand filter function $F(P_F, S_F)$ or, optionally, a three-operand filter function $F(P_F, S_F, D_F)$ ; (2) the source filter bitmap, $S_F$, (3) a pattern filter bitmap, $P_F$; and (4) a destination bitmap $D_F$, if the three-operand filter function is used. In U.S. Pat. No. 5,502,804, the term "halftone" is used instead of "pattern" and halftone mask is used instead of pattern filter bitmap.

More specifically, the additional orders defined for filters and other operations needed for operation of the invention perform the following functions:

| | |
|---|---|
| Set Filter Boolean | Sets a hardware "register" with a boolean value that will be used in the next and subsequent operations until another Set Filter Boolean command replaces it. |
| Set Source Filter Address | Sets the starting address of the source filter to be used until another Set Source Filter command replaces it. |
| Set Pattern Filter Address | Sets the starting address of the pattern filter to be used until another Set Pattern Filter command replaces it. |

Further information regarding these orders or commands is provided below in connection with the description of hardware commands/operations which could be used to perform cooperative filter and raster operations according to the present invention with respect to the correct evaluation example shown in Table 4 below.

The functional block elements of FIG. 1 perform the same functions as their correspondingly numbered functional block elements of FIG. 4 of U.S. Pat. No. 5,502,804 and, therefore are not described herein. Host application 11 of FIG. 1 corresponds to PDL interpreter 21 of FIG. 4, and as previously pointed out, realtime image generator 21 of FIG. 1 corresponds to realtime Blit processor 37 of FIG. 4. The additions to realtime image generator needed for an understanding of the present invention are described below.

The following is a definition/description of various terms employed herein.

Raster Graphics Data

Raster graphics data is a rectangular grid where each grid element is a called a pixel. An example is shown in FIG. 1. The size of the grid is described in terms of width and height. A pixel can be uniquely identified by its <x,y> coordinate, where $1 \leq x \leq width$ and $1 \leq y \leq height$, within the rectangular grid. If G is a rectangular grid, a pixel is denoted within G as G<x,y>.

A pixel can be broken down into components and depth. A pixel component represents the contribution of a primary color to the pixel. In a monochrome printer or black and white video display, each pixel has only one component, and that component represents the amount of black ink (printer) or white light (display). In a color environment, a pixel normally has three or four components. A color video display typically has three components: red; green; and blue. Pixels with these color components are called RGB pixels. A printer usually has three or four components: cyan; magenta; yellow; and, optionally, black. Pixels with these components are called CMY pixels or CMYK pixels. In addition to these color models, new models, such as hi-fi color, are emerging. And other models to represent color which are not visual, such as the many variations of CIE-XYZ device independent color spaces, exist. The present invention has application to all of these models.

The depth of a pixel determines the number of discernible values each pixel component may have. Typically depth is 1, 2, 4, or 8. Given a value d for a pixel's depth, each component has $2^d$ discernible values. For example, a pixel with depth 8 allows each component to have 256 discernible values. These can be numbered sequentially from 0 to $2^d-1$.

On a digital device, each pixel component is represented as a binary value requiring d bits, where a bit is either a "1" or a "0". For example, a pixel component with value 201 and depth 8 is represented using the binary value "11001001".

Logical Operations

A logical operation is a mapping of truth values into a truth value. A truth value has one of two values: true or false where true is denoted as "1" and false is denoted as "0".

There are three logical operations named AND, OR, and NOT. In this description, the symbols &, |, and ~, respectively, are used to denote these operators.

A compound logical operation is an arbitrary combination of logical operations. For example, if P, Q, and R are truth values, then "((~P)&Q)|R)" is a compound logical operation whose result may be obtained as follows:

1. Let T1="~P"
2. Let T2="T1&Q"
3. Let T3="T2| R"
4. T3 is the final result of "((~P)&Q)|R)"

Pixel Operations

A pixel operation is a compound logical operation R applied to corresponding bits of one or more equally sized pixels. For example, given two pixels p1 and p2 with values "1100", and "1010", respectively, then ~p1 becomes "0011", p1&p2 becomes "1000", and p1|p2 becomes "1110".

Raster Operations

A raster operation is any pixel operation R applied to each set of corresponding pixels of one or more equally sized raster graphics data operands. A raster operation is called a ROP in a Microsoft Windows environment, a Logical Operation in the various dialects of Hewlett Packard's PCL5 language, and a Boolean operation in an Intel i961KD processor or a Motorola 68322 processor. Within computer graphics processing, the number of operands is usually three, pattern (P), source (S), and destination (D), and the result of the raster operation replaces D. In an actual implementation, P is typically smaller than S and S is smaller than D. However, P is used to "tile" over S, and the effective area of D is limited to the size of S, so one does not lose any generality by assuming equal sizing of the operands. In this description, the discussion of raster operations concentrates on the three traditional computer graphics operands. In general, however, raster operations can be applied to any number of operands.

The effect of pixel operation R and its operands upon D are denoted as "D←R(P,S,D)". The evaluation is by Algorithm 1 as shown in Table 1, although specific implementations may vary.

TABLE 1

Algorithm 1 - Evaluating a raster operation.

Begin
Let *width* and *height* be the width height of the operands P, S, and D, respectively.
For each <x,y> pair, $x \leq width$, $y \leq height$
    D<x,y> = R(P<x,y>, S<x,y>, D<x,y>)
End Sequences of raster operations are used in graphics environments to construct complex images. A page of a business document may contain a lot of text and a figure or two. Or a presentation may have a shaded background, borders, clipart and text. These types of page images are constructed by their applications using a sequence of raster operations. For example, first a background may be painted. This may be followed by several lines of text. Then some pieces of clipart may be inserted. Each of these steps may use a different raster operation to achieve a specific effect.

The destination is the holder of the image being constructed, and typically represents a page or a video display. A source is a graphical object that needs to be placed on the destination. For example, a character, a line, a polygon, or a photograph are typical examples of a source. A pattern is an effect to apply to the source. For example, one may construct a checkerboard by applying a pattern with alternating colored boxes to a rectangular source.

A Monochrome Raster Operation Example

Raster operations are simplified for the case where depth is 1. This is called bi-level monochrome and represents the traditional monochrome laser printer. Consider the desire to place a gray letter such as an "O" onto a page. An "O" is represented digitally with "1"s denoting the ring and "0"s (zeros) denoting the interior. To place a gray "O" onto the page, the "O" would be the source of the raster operation. The desired gray would be represented as the pattern. The pattern would contain a combination of "1"s and "0"s in a ratio that produces a desired shade of gray. When placing the "O" onto the page, it may be that the "O" will be placed on top of a previously drawn object, a polygon for example. It is desirable for the "O" to be placed such that the ring replaces corresponding pixels in the polygon, but the polygon is preserved for pixels corresponding to the interior of the "O". This normally is achieved with the raster operation:

$$D \leftarrow (S\&P)|(\sim S\&D) \qquad [1]$$

This causes the "1"s in source (S) to obtain the gray of the pattern (P) while the "0"s (zeros) in S preserve the corresponding destination pixels. It should be noted that the use herein of the term bitmap describes raster graphics data for the specific case in which the depth is 1 and there is 1 component, whereas raster graphics data is the general term for any depth or number of components. Also, a gray value on a monochrome device with a depth of 1 is represented as a pattern. A pattern is a bitmap in which the percentage of "1"s represents a shade of gray.

Determining the Raster Operation

Because a raster operation has three operands, there are 256 possible raster operations (since the number of raster operations between n boolean variables is 2 (2n) or 2**8 in this case where n=3.

In order to determine which raster operation is appropriate, one needs to write down the possible combinations of three operands and choose those combinations that are appropriate for a given operation. A compound logical operation can then be constructed from this choice, and this operation becomes the raster operation.

Table 2 shows all possible combinations of three operands and eight data values and can be used to achieve this goal. The gray character example will be used to demonstrate.

TABLE 2

3-Operand logic table to determine a raster operation.

| Operand | Data Values |
|---|---|
| P | 11110000 |
| S | 11001100 |
| D | 10101010 |
| raster operation | desired result |

First, write down logical forms of the three operands. The logical forms are such that a "1" means has color and a "0" means does not have color. In the previous example, the desire is for D to be preserved when S does not have color and for S and P to be applied when S does have color. To determine the desired result, one inspects each of the 8 columns in the data values part of the table to choose which combinations of P, S, and D are desirable. In this case, the desired result is for the effect of P to be applied to S whenever S is "1", and for D to be preserved otherwise. Given the table above, the desired result is 11100010.

A compound logical operation is constructed for each "1" in this result, and these operations are combined by use of the "|" operation to achieve a combined compound logical operation which is then simplified.

For this example, 11100010 can be expressed as (P&S&D)|(P&S&~D)|(P&~S&D)|(~P&~S&D).

which simplifies to ((P&S)&(D|~D))|((P|~P)&(~S&D)).

Finally, one can eliminate (D|~D) and (P|~P), as these are always true, yielding (P&S)|(D&~S).

The raster operation, therefore is

D←(P&S)|(D&~S)

which is the same as equation [1].

Transparency

Since the destination is constructed by a sequence of raster operations, a given raster operation may affect a destination area that has had one or more objects already placed in it. Therefore, a new source object may intersect objects already in the destination. In one case, one may wish for the source to cover the destination object along the intersection points. In another case and as in the example above, one may wish those parts of the source that have color to cover the destination, but those parts of the source that are colorless to not affect the destination. Or, one may wish that only those parts of the source not intersecting existing destination objects get placed on the destination. Many other possibilities exist.

The mechanism which achieves these effects is called transparency. This is a secondary attribute applied to the raster operation that further determines the portions of the pattern and source that get applied to the destination. It describes how to apply the colorless pixels in the operands. As an opposite of transparency, the word opaque is often used.

In traditional imaging models, transparency is an attribute associated with source and pattern objects. This makes it difficult to achieve the effect of giving existing destination objects precedence. This definition may be generalized to include transparency as an attribute of destination thereby removing this limitation. This makes possible an operation in which one wishes the existing destination objects to not get covered, so that only those parts of the source that do not intersect existing destination objects are placed on the destination.

The transparency model assigns a truth value to each pixel which denotes "colored" or "colorless" using "1" and "0", respectively, for these truth values. Since transparency is a relation upon truth values, logical operations may be applied.

Traditional Model

Before introducing a generalized definition, a traditional model offered by Hewlett Packard's PCL will be described. This model defines four transparency modes. These are 1. Opaque Source, Opaque Pattern (OO)
2. Opaque Source, Transparent Pattern (OT)
3. Transparent Source, Opaque Pattern (TO)
4. Transparent Source, Transparent Pattern (TT)

Source transparency determines the effect of colorless pixels in the source as they are applied to the destination. In terms of color data, a colorless value is allowed to be the same value as white in a CMY or CMYK model, or black in an RGB model. When transparent, the corresponding destination pixels do not change as a result of the raster operation. When not transparent, the destination pixels are changed according to the raster operation. Similarly, pattern transparency determines the effect of colorless pixels in the pattern, but only as applied through the colored pixels of the source. Only the colored pixels in the source are affected by pattern pixels. The affected source pixels become transparent depending upon the pattern transparency. A colorless pixel in a transparent pattern causes a corresponding colored pixel in the source to become transparent, thereby not affecting the destination. Colorless source pixels are not affected by pattern transparency, they are only subject to source transparency.

As in the previous example, it is often the case that one only wants the colored pixels of a shape (e.g., the ring of the "O") to affect the destination. For example, the destination may already consist of a light gray and the desired effect is to place a dark gray character on top of the light gray background such that the background is visible through the colorless pixels of the character (i.e., the inside of an "O"). This is the purpose of transparency.

Transparency and Raster Operations

The effect achieved in the previous example can also be realized using a transparency mode of "TO" and a raster operation "D←S&P". The transparency mode states that only those pixels in S that are not colorless affect D. Therefore, in the case of the character "O", the interior of the character is colorless so that the corresponding destination pixels are preserved. Only the outline portion of the character affects the destination, and this would be done according to the pattern desired.

Depth and Number of Components is One

When pixel depth is 1 and the number of components per pixel is also 1, one can combine a raster operation with transparency to form a new raster operation. This is because in a monochrome image, a pixel's value is either "1" or "0". Therefore, transparency can be expressed as a function directly upon the source and pattern raster graphics data operands. To do this one must first specify the transparency modes as logic expressions. The pixels that are transparent can be expressed logically according to transparency mode as follows:

1. OO: "False", i.e., no pixels are transparent
2. OT: "S&~P", i.e., the transparent pixels are those that are colored in S and colorless in P
3. TO: "~S", i.e., the transparent pixels are the colorless pixels in S
4. TT: "~(S&P)", i.e., the transparent pixels are those that are colorless in either S or P Given a logical expression for transparency, one can create a single expression that combines raster operation with transparency. If the raster operation is R and the transparency expression is T, then the effect on D can be written as an expression of two terms. One term describes the effect of R applied to D due to non-transparent (or opaque) pixels of S and P. The second term preserves those pixels in D that correspond to transparent pixels. This can be written logically as $$D \leftarrow (R\&\sim T)|(D\&T). \qquad [2]$$

Given the previous example of "D←S&P" with transparency mode "TO", one can apply equation [2] to get

D←(S&P&~~S)|(D&~S).

This simplifies to

D←(P&S)|(D&~S)

which is equivalent to equation [1] of the first example.

Using the logical expressions of the four transparency modes and Equation 1, logical operations and transparency can be combined into the following four equations:

OO: D←(R&~False)|(D&False)

OT: D←(R&~(S&~P))|(D&(S& ~P))

TO: D←(R&~~S)|(D&~S)

TT: D←(R&~~(S&P))|(D&~(S&P)).

These can be simplified to

OO: D←R  [3]

OT: D←(R&(~S|P))|(D&(S&~P))  [4]

TO: D←(R&S)|(D&~S)  [5]

TT: D←(R&(S&P))|(D&~(S&P)).  [6]

Depth Or Number Of Components Are Greater Than One

The previous results were based upon logic and well-known algebraic relations of the logical operators. Logic, however, is by definition an expression between two truth values. Since the preceding assumed a depth of 1 and 1 component per pixel, traditional logic can be applied so that the model for traditional monochrome output devices is complete.

The problem becomes much more complex when depth or the number of components is greater than one. Pixel data of this category is referred to as multiple-bit. This complexity is because pixels may no longer be represented as truth values as there is more than one value that represents color. Consequently, the raster graphics data operands P, S, and D can no longer be used to represent transparency themselves. This is in contrast to the monochrome example in which a pixel is either "1" or "0".

The multiple-bit pixel problem is uniquely solved by separating the notion of transparency from the notion of raster operation and developing a mutually cooperative model for each. This is different than prior art solutions which use complex algorithms to merge these concepts together. See, for example, "PCL 5 Color Technical Reference Manual," Hewlett Packard, Edition 1, September 1994, Part Number 5961-0635, page 5–12. Specifically, the prior art approaches specify an algorithm that is unique for each transparency mode. This adds complications if one wishes to introduce additional transparency modes. The model using the present invention has one algorithm that is suitable for all transparency modes, as well as a complete generalization of transparency beyond the four modes OO, OT, TO, and TT.

Erroneous Evaluation Example

Before delving into the evaluation model, an example demonstrates why one cannot combine transparency and raster operation to produce a new raster operation for multiple-bit pixel data as was done previously. This example is shown in Table 3.

In this example, there is a transparency mode of TO. This implies a transparent source and an opaque pattern. For this example, one may use CMY pixels so that white or colorless is defined as all three components having value zero. Each component has a depth of 4. The source has three pixels, 100% cyan, 100% magenta, and white (or colorless). 100% implies the maximum amount of color, which at a depth of 4 is 15. In binary form, 15 is written as "1111".

Since the transparency mode is TO, only S is used to determine transparent pixels. Within S, only the third pixel is colorless. So, the correct result should apply the raster operation to the first two pixels of D and preserve D in the third pixel. The raster operation, "D←S&P", applied to the first pixel yields <1111,0000,0000> and to the second pixel yields <0000,0000,0000>. The third pixel should be preserved so the value of D for this should remain <0000,0000, 1111>.

What results, however, is that the first two pixels are erroneous. They yield green and yellow. Only the last pixel is correct.

This occurs because both sides of the combined operation yield content for the erroneous pixels. The (S&P) side is intended to describe the effect of the raster operation for non-transparent pixels, whereas the (D&~S) side is intended to preserve the pixels in D for transparent pixels in S. Therefore, it should never be the case that both of these terms contribute to the results. For the two erroneous pixels, however, the yellow from each of the pixels in D was preserved in the result even though some pixels were not transparent.

TABLE 3

Erroneous Evaluation Example.

Let depth be 4, width be 3, and height be 1
Let the print model be CMY (so that white is 0)
Let S be the three pixels: 100% cyan, 100% magenta, and white (C, M, 0)
Let P be the three pixels: 100% black, white, 100% black (CMY, 0, CMY)
Let D be three 100% yellow pixels (Y, Y, Y)
Let the transparency mode be transparent source and opaque pattern (TO)
Let the raster operation be D ← S & P.
The combined master/transparency operation is (S & P) | (D & ~S)
A pixel's components are denoted as <c, m, y> where c, m, and y are the binary values of the cyan, magenta, and yellow components, respectively.
Inputs $1^{st}$ S pixel = <1111, 0000, 0000>   $1^{st}$ P pixel = <1111, 1111, 1111>
$2^{nd}$ S pixel = <0000, 1111, 0000>   $2^{nd}$ P pixel = <0000, 0000, 0000>
$3^{rd}$ S pixel = <0000, 0000, 0000>   $3^{rd}$ P pixel = <1111, 1111, 1111>
All three D pixels (before evaluation) = <0000, 0000, 1111>
Erroneous evaluation $1^{st}$ Pixel  <1111, 0000, 0000,> & <1111, 1111, 1111> |
        <0000, 0000, 1111> & <0000, 1111, 1111> = <1111, 0000, 1111>
$2^{rd}$ Pixel  <0000, 1111, 0000> & <0000, 0000, 0000> |
        <0000, 0000, 1111> & <1111, 0000, 1111> = <0000, 0000, 1111>
$3^{rd}$ Pixel  <0000, 0000, 0000> & <1111, 1111, 1111> |
        <0000, 0000, 1111> & <1111, 1111, 1111> = <0000, 0000, 1111>
Result Destination is (CY, Y, Y) or (100% green, 100% yellow, 100% yellow)
The right answer is (C, 0, Y) or (100% cyan, white, 100% yellow)

Correct Evaluation Example

Since logical operations operate on truth values, that is values that are either "1" or "0", the notion of a pixel is not captured in the erroneous example. Consequently, the recognition of colored and colorless is lost in the multiple-bit pixel case. This is true regardless of the number of components. The fact that S is colored in the first two pixels should inhibit the inclusion of "D&~S" in those pixels' results. Conversely, since the third pixel in S is colorless, the evaluation of that pixel should exclude the contribution of "S&P". Combining the raster operation with the transparency mode into a single operation between three operands loses this distinction.

Given this breakdown of the pixels in S and how the result of D should be derived, the evaluation in Table 4 shows how the correct result is obtained. The first two pixels are colored in S

TABLE 4

Correct Evaluation Example.

Let depth be 4, width be 3, and height be 1
Let the print model be CMY (so that white is 0)
Let S be the three pixels: 100% cyan, 100% magenta, and white (C, M, 0)
Let P be the three pixels: 100% black white, 100% black (CMY, 0, CMY)
Let D be three 100% yellow pixels (Y, Y, Y)
Let the transparency mode be transparent source and opaque pattern (TO)
Let the raster operation be D ← S & P.
A pixel's components are denoted as <c, m, y>
Inputs $1^{st}$ S pixel = <1111, 0000, 0000>   $1^{st}$ P pixel = <1111, 1111, 1111>
$2^{nd}$ S pixel = <0000, 1111, 0000>   $2^{nd}$ P pixel = <0000, 0000, 0000>
$3^{rd}$ S pixel = <0000, 0000, 0000>   $3^{rd}$ P pixel = <1111, 1111, 1111>
All three D pixels (before evaluation) = <0000, 0000, 1111>
Correct evaluation $1^{st}$ Pixel   <1111, 0000, 0000> & <1111, 1111, 1111> = <1111, 0000, 0000>

TABLE 4-continued

Correct Evaluation Example.

$2^{nd}$ Pixel   <0000, 1111, 0000> & <0000, 0000, 0000> = <0000, 0000, 0000>
$3^{rd}$ Pixel   <0000, 0000, 1111> = <0000, 0000, 1111>
Result Destination is (C, 0, Y) or (100% cyan, white, 100% yellow)

so the raster operation is applied to S and P to derive D. Since the third pixel of S is colorless, the pixel in D is preserved.

Additional Problems

In the preceding examples, the detection of colored and colorless pixels for S is derived from the same data in which the raster operation is applied. However, in actual printing and display applications, the data may go through some transformations before the raster operation is evaluated. These transformations introduce additional complications as transparency and raster operations are expressed upon inputs.

The transformations may be broadly categorized as adjustment, conversion, and dithering.

Adjustment is the application of special effects to. the input data. For example adding contrast or brightness. Conversion takes color in one of many input forms and maps this data to the form used by the target device. For example, a photograph will likely have RGB raster graphics data, but a printer will likely have CMY or CMYK inks or toners. Finally, dithering is a process of reducing depth and/or compensating for undesirable characteristics of the target device (e.g., high pitch banding on a laser printer). A typical photograph, for example, has a depth of 8, whereas a printer may have depths 1, 2, 4, or 8. A dithering process is employed to reduce the depth appropriately via a process called halftoning. Dithering can also be used to reorganize color to compensate for disturbing artifacts today's printers may introduce.

Each of these transformations change the raster graphics data. In doing so, each may introduce color into pixels where color was not originally present, or may make some pixels colorless which were not colorless originally.

Transparency is expressed upon the inputs, independent of the transformations a given system may apply for reproduction purposes. Consequently, the recognition of colored and colorless pixels must be at the input level.

However, since raster operations must use homogeneous data, and treat the destination as an operand as well as the holder of the results, raster operations must be exercised upon transformed raster graphics data. Consequently, five operands are required to fulfill a raster operation with transparency expressed upon S and P. These operands are the three transformed raster graphics data operands P, S, and D plus transparency raster graphics data operands. The transparency operands are called $P_T$ and $S_T$, respectively. These operands represent the colored and colorless pixels in the input forms of P and S.

It is noted here that the traditional model only considers P and S with regard to transparency. This makes operations such as "fill all colorless destination pixels with patterned source color" impossible. The model used by the present invention overcomes this limitation by introducing D as an operand of transparency, as well as completely generalizing the possible variations of transparency. Before delving into that discussion, however, the following shows how $P_T$ and $S_T$ are traditionally used.

The following is a description of the "orders" or hardware commands/operations that could be used to perform cooperative filter and raster operations according to the present invention.

A hardware implementation of cooperative filter and raster operations requires an interface that the software can use to set up the transparency filter or filters and the boolean operations to be applied between the filter and the source or pattern. The software interface must also include operations or commands (orders) to produce the image in memory. The following is a description of the necessary commands followed by an example showing use of the commands that could be used to produce a desired image:

TABLE 5

| Opcode | Command | Description |
| --- | --- | --- |
| set_bbmap | Set Band Buffer | Sets the address and other parameters of the image destination. One of these commands is required for each band buffer of an image. |
| set_bool_hs | Set Filter Boolean | Sets a hardware "register" with a boolean value that will be used in the next and subsequent operations until another Set Filter Boolean command replaces it. |
| set_bool_d<br>set_bool_hd<br>set_bool_sd<br>set_bool_shd | Set Raster Operation Boolean | Sets a hardware "register" with a boolean value that will be used in the next and subsequent operations until another Set Raster Operation Boolean command replaces it. The last portion of the Opcode indicates whether the boolean is to be applied to operations involving the destination (d), the pattern or halftone (hd), source (s), or all three (shd) |
| set_smask_sa | Set Source Filter Address | Sets the starting address of the source filter to be used until another Set Source Filter command replaces it. |
| set_pmask_sa | Set Pattern Filter Address | Sets the starting address of the pattern filter to be used until another Set Pattern Filet command replaces it. |
| set_htbmap | Set Pattern Parameters | Establishes the characteristics of the pattern to be used in subsequent raster operations. Characteristics include size, width, and height. |
| set_sbmap | Set Source Bitmap Parameters | Establishes a source bitmap warp to be used in subsequent operations. the warp characteristic applies to all raster operations until it is changed. |
| blt2bb_shd | Perform Raster Operation with Source, Pattern and Destination | Causes the generation of an image based on the current filters and boolean set by previous commands. |

In Table 5. the opcodes set_bbmap, set_bool_d, set_bool_hd, set_bool_sd, set_bool_shd, set_htbmap, set_sbmap and blt2bb_shd are opcodes for commands which are described in U.S. Pat. No. 5 5,204,804. The opcodes set_bool_hs, set_smask_sa and set_pmask_sa are opcodes for new operations which would need to be implemented to practice the present invention. The details of an implementation of these new opcodes (i.e., the operations performed by these opcodes or similar opcodes) should be apparent to persons of ordinary skill in art based upon the descriptions contained herein.

There are two basic raster operations required: one that includes source and destination only, and one that includes source, pattern and destination. If the source may be represented in more than one way, there may be two operations defined for each source representation. For example, the source may be represented as a run length encoded object. It may be desirable to define two distinct operation codes. In either case, the Perform Raster Operation with Source, Pattern and Destination command includes the arguments necessary to give the memory location of the source, destination, and optional pattern. The height and width of the destination are required arguments. Since the memory location of the destination may be expressed as an offset or an x, y location, the command must include an origin for the destination or alternately a "band buffer" designation. Other parameters may be included to allow adjustment of the pattern.

With the above operations it is possible to construct a list of "orders" or commands to render objects in a frame buffer or band buffer in memory for subsequent output. The example in Table 4 can be rendered using the following sequence of commands where the items in parenthesis are arguments used by the command:

--- set_bbmap (band buffer number, render direction, warp of buffer in bits, physical address of band buffer origin, start of band logical bit address, end of band physical bit address)
set_sbmap (warp of source)
set_htbmap (size, width, and height of pattern)
set_bool_sh (source filter boolean)

---

The source filter boolean is "00001010" in the example shown in Table 4.

--- set_smask_sa (address of the source filter)

---

The address of the source filter is "00000110" in the example of Table 4. The source filter is assumed to contain one bit for each pixel of the source.

--- set_bool_shd (boolean to be used in raster operation)

---

The boolean to be used in raster operation is "1100000" in the example.

--- blt2bb_shd (band number, destination logical bit address, frame width in bits, frame height in scanlines, source physical address, pattern physical address, pattern (halftone) x remainder, pattern (halftone) y remainder)

---

The remainder parameters deal with placement of the pattern (halftone).

The command set_pmask_sa shown in Table 5 is not used in the foregoing example because the transparency is TO meaning that the source is transparent and the pattern is opaque. However, the arguments to the set_pmask_sa command would be as follows:

--- set_pmask_sa (address of the pattern filter)

---

The pattern filter is assumed to contain one bit for each pixel of the pattern.

For the most part, the parameters in the foregoing commands should be readily apparent. However, the following provides a description of those arguments whose function or type may not be readily apparent.

1. Band Number and Band Buffer Number: The term band refers to a rectangular section of a bitmap image that is less than the whole image. Often an image may be rendered in numerous, small bands. When a single display list (order list) is built for all of the bands to be rendered, then the raster operation commands in the list must indicate the particular band to which the command applies. This particular band is referred to as the band number. If a separate display list is built for each band, this argument would not be necessary. The band buffer number is the corresponding buffer used to store the band information.

2. Pattern (Halftone) x Remainder, y Remainder

A pattern is applied to an object repeatedly to fill or paint the object. This allows a small pattern to fill a larger object. The repeated application of a pattern within the boundaries of an object is often called "tiling." Unless otherwise indicated in the arguments for a raster operation command, it is assumed that any pattern has its origin at the top, left of the page image. The pattern x remainder and pattern y remainder arguments allow for the adjustment of the origin and tiling of the pattern relative to the source object when they are combined with the destination. In the nominal case the x and y remainder arguments are set to the width and height of the pattern. In this case the pattern origin or anchor point is the top, left hand corner of the page image. This means that the pattern is applied to the object modulo the pattern width and height. By choosing other values for the x remainder and y remainder the user of the command, blt2bb_shd can effectively alter the pattern origin or anchor point such that the pattern is applied to the object starting with a particular bit position within the pattern.

Traditional Evaluation

In order to achieve the correct evaluation, traditional methods define sequential algorithms, or complex formulae, one for each transparency mode. One example of this is shown on pages 5–12 of "PCL 5 Color Technical Reference Manual," Hewlett Packard, Edition 1, September 1994, Part Number 5961-0635.

$$OO:D \leftarrow R \quad [7]$$

$$OT:D \leftarrow (R\&(\sim S_T|P_T))|(D\&(\sim P_T\&S_T)) \quad [8]$$

$$TO:D \leftarrow (R\&S_T)|(D\&\sim S_T) \quad [9]$$

$$TT:D \leftarrow (R\&(S_T\&P_T))|(D\&\sim(S_T\&P_T)) \quad [10]$$

Note that these are similar to equations [3], [4], [5], [6].

In this example the transparency operands $P_T$ and $S_T$ must be expanded to the depth of the P, S, D such that a colored pixel has a maximum value $(2^d-1)$ and a colorless value is 0.

Problems With The Traditional Approach

The traditional evaluation model has some fundamental problems. First, it is limited to four transparency modes. To add a new transparency mode, therefore, requires a new algorithm for that mode. Certainly in a software only system, this is not a tremendous task. However, in order to add a new algorithm to hardware, one is required to create new hardware. Therefore, this model is not easily extensible to hardware architectures.

Second, this model is computationally complex. Therefore, both hardware and software implementations will have an excessive processing burden. When one considers the large quantity of data needed to produce a page on a color laser printer, up to 128 MB for letter-size page at 600 dots per inch with four components and a depth of 8, and real-time considerations, perhaps 3 to 6 pages per minute, excessive computation may limit capabilities or require very expensive processors.

Next, this solution places stress on a low memory real-time environment. This is because the transparency operands must be of the same depth as P, S, and D. This implies these operands must be compressed which then puts stress upon real-time decompression requirements.

Finally, this method excludes destination as a transparency operand. An operation in which one wishes existing destination objects to not get covered, so that only those parts of the source not intersecting existing objects get placed on the destination, becomes very difficult. Allowing destination transparency eliminates this problem.

Filters

The invented solution overcomes all of the problems the traditional solution imposes. The basis of this solution is to separate transparency into filter operations and raster operations. A model for transparency is defined which includes destination as a transparency operand. This model is based upon filters and filter operations. As the raster operation model is complete, it is not altered. Last, the mechanism which allows the models to work cooperatively is defined.

A filter is raster graphics data where each pixel has 1 component, has a depth of 1, and whose value represents either colored ("1") or colorless ("0"). Filters denoted $P_F$ and $S_F$ are used to represent the colored and colorless pixels in the input forms of P and S, respectively. These filters are used to implement the effects of transparency serving the purpose of $S_T$ and $P_T$.

A filter for a source or pattern represents the colored and colorless pixels in the input source or pattern, that is before any transformations. Each filter can be constructed by Algorithm 2 shown in Table 6.

TABLE 6

Algorithm 2 - Determining a filter for a raster graphics data operand.

```
Begin
  Let G denote an input raster graphics data of size width and height
  Let F denote the filter to construct for G
  For each <x, y> pair, x ≦ width, y ≦ height
    If G <x, y,> is colored then
       F <x, y> = 1
    Otherwise
       F <x, y> = 0
End
```

A filter is also maintained for D and denoted as $D_F$. However, this filter is constructed from $S_F$ and $P_F$ much like D is constructed through raster operations applied to P, S, and D. In this fashion, $D_F$ represents the colored and colorless pixels in D due to a sequence of raster operations with regard to input patterns and sources.

Filter Operations

A filter operation is any compound logical operation F applied on a repetitive basis to corresponding pixels in one or more equally sized filters. Although this definition is generally unbounded, the application in computer graphics processing is described much in the same way as was done with raster operations. For this, three equally sized filters $P_F$, $S_F$, and $D_F$ are used.

The application of F to its three operands is denoted as $F(P_F, S_F, D_F)$.

A filter operation is used to determine which outputs of a raster operation get applied to the destination. If a filter operation yields a "1", the associated output of the raster operation is applied to the corresponding destination pixel.

Otherwise, the destination pixel is unchanged. It is in this fashion that the phrase "cooperative filter and raster operations" is used.

Determining A Filter Operation

As with raster operations, since a filter operation has three operands, there are 256 of them possible. A filter operation can be determined in much the same way as a raster operation. This is done using Table 7.

First write down all combinations of logical forms between the three operands. To determine the filter operation, one inspects each of the 8 columns in the data values part of the table to choose which combinations of $P_F$, $S_F$, and $D_F$ are desirable.

TABLE 7

3-Operand logic table to determine a filter Table 6:

| Operand | Data Values |
|---|---|
| $P_F$ | 11110000 |
| $S_F$ | 11001100 |
| $D_F$ | 10101010 |
| filter operation | desired result |

Suppose it is desired that the filter be constructed that represents all colorless pixels in S or all colored pixels in S that correspond to colorless pixels in P. The combinations 111, 110, 101, 100, 001, and 000 achieve this result. This can be written in logic form as $(P_F \& S_F \& D_F)|(P_F \& S_F \& \sim D_F)|(P_F \& \sim S_F \& D_F)|(P_F \& S_F \& \sim D_F)|(\sim P_F \& \sim S_F \& D_F)|(\sim P_F \& \sim S_F \& D_F)$ One can use logic algebra to simplify this to the filter operation $(\sim S_F|P_F)$.

Note that the transparency expression for OT is (S&~P), and that this filter operation is the opposite of this or ~(S&~P)=(~S|P).

Cooperative Filter And Raster Operations

Filter operations are used to determine the colored and colorless pixels in the three raster operation operands. A raster operation is as defined earlier. In this fashion, a filter operation acts as a sieve with regard to the changes in D. If a filter operation yields a result of a colored pixel, the raster operation is applied to the corresponding destination pixel. Otherwise the destination pixel is unchanged.

Flowchart

Figure 3:
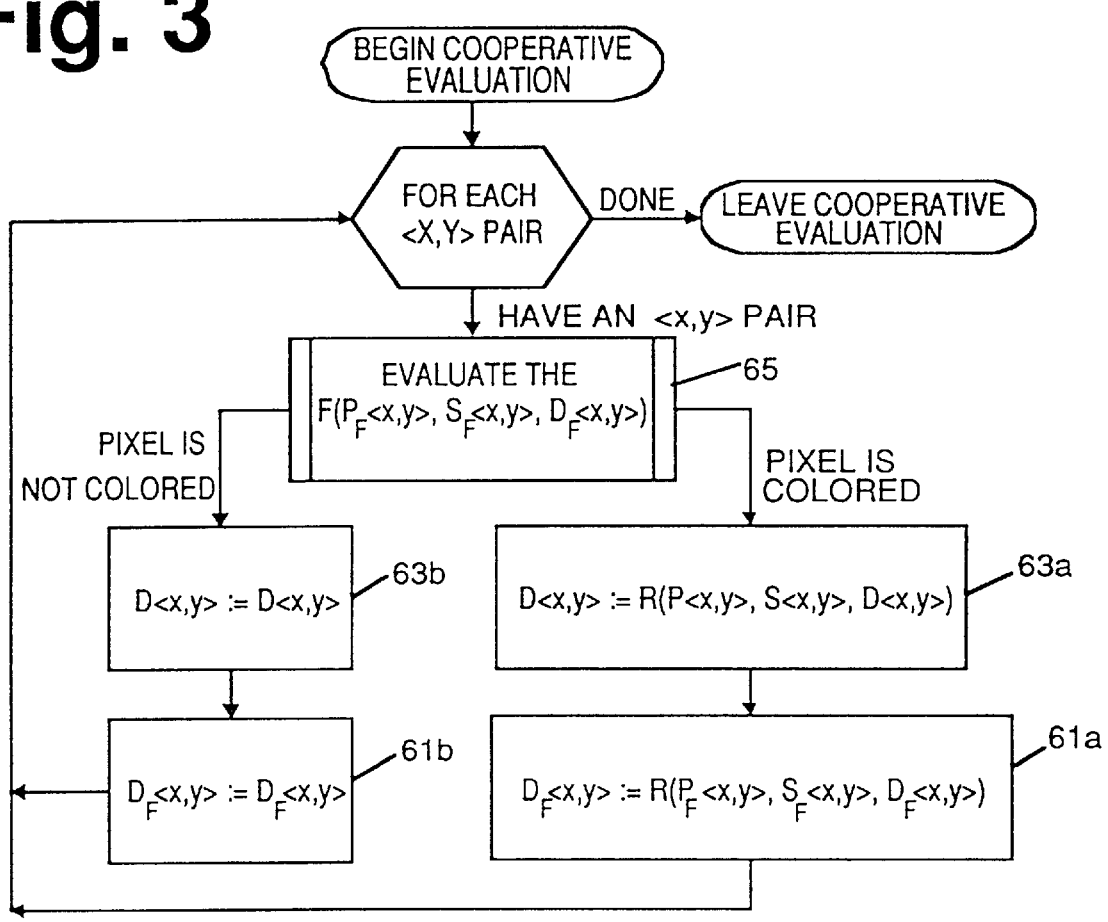
FIG. 3 is a flowchart showing the cooperative evaluation algorithm.

In this model there are six operands, three filter operands, $P_F$, $S_F$, $D_F$, and three raster operands, P, S, and D. Given these six operands, a filter operation F, and a raster operation R, Algorithm 3 described in the flowchart in FIG. 3 shows the evaluation model. Specifically, the filter operations 61a and 61b determine which pixels in D are changed, and the raster operations 63a and 63b describe the change to D. In FIG. 3, Since $D_F$ must be generated from the colored and colorless input raster graphics data according to the raster operation, the raster operation is also used to update $D_F$. In this model, only $D_F$ and D need initial values. $D_F$ is initialized to colorless and D is initialized to 0.

EXAMPLE

To demonstrate the algorithm, one may use the same data as the erroneous example. Recalling Table 3, there is a source S which is (C, M, 0), a pattern P which is (CMY, 0, CMY), and a destination D which is (Y, Y, Y). From this one can write $S_F$ as "110", $P_F$ as "101", and $D_F$ as "111".

Since the transparency mode is TO, let F be "$S_F$". That is F is the opposite of the logical operation "~S" that represents a transparent source and an opaque pattern with a filter as input rather than the source itself.

Since F is $S_F$, the colored pixels due to the filter operation are the first two. Applying the raster operation

"D←(S&P)"

to the first two pixels and preserving D for the third pixels yields (C, 0, Y) as desired. Also note that the first two pixels of $D_F$ must be updated and this results in a new $D_F$ value of "101".

Use With Prior Art Transparency Modes

In Algorithm 3 (see FIG. 3), a filter is used to produce the effect of transparency while the raster operation describes the effect of non-transparent operations. This mechanism employs the filter operation 65 as an input into the algorithm. Hence, one algorithm serves all modes of transparency. The difficulty is the creation of the filter and the determination of the filter operation. The method has been shown for filter creation explicitly in Algorithm 2. It has also been demonstrated how to construct a filter operation using a logic table. The filter operations suitable for the traditional four transparency modes are shown below:

OO: 1 (or always colored)

OT: $\sim S_F|P_F$

TO: $S_F$

TT: $S_F \& P_F$

These filter operations when used with Algorithm 3 yield the same results as equations [7], [8], [9], and [10].

Use With Non-Traditional Transparency Modes

Consider the desire to fill portions of D that do not have color with a raster operation. This can be achieved using a filter operation of $\sim D_F$ and Algorithm 3. This can not be done with the traditional model.

In order to achieve this, $D_F$ must be constructed along with D. This is done by applying the raster operation to the three filter operands to produce the destination filter. The destination filter is subject to the same transparency effects are the pattern, source, and destination.

Hardware Implementation

The cooperative filter and raster operation evaluation model is very efficient for software implementation when compared to traditional solutions. Additionally, it has a significant advantage for hardware implementation. This advantage is even greater for devices with real-time constraints such as color and monochrome laser printers. Before discussing these advantages, a circuit for a three operand model is introduced.

Generalized Hardware Circuit

The generalized form of a three operand hardware circuit diagram will now be described with reference to FIG. 4. This diagram is an implementation of Algorithm 3. In the hardware circuit, all three logical operations can be performed in parallel. These operations are contained in the two raster operation logic units 71 and 73 and in the filter operation logic unit 75. Each of these units recognizes 256 distinct operation codes that determine the compound logical operation to perform. The operation code informs the unit what the result for the eight binary combinations of the three input operands should be. The outputs of these three units are synchronized on a pixel basis.

The first raster operation unit computes the result of the raster operation applied to the raster graphics data of the pattern, source, and destination. The second raster operation unit computes the result of the raster operation applied to the filters for the pattern, source, and destination.

The filter operation unit emits "1" if the result for a pixel is colored according to the filter operation and "0" otherwise.

The outputs of the three operation units are input into multiplexors referred to as selection units 81 and 83. Selection is based upon the output of the filter operation logic unit 75. Selection Unit 1 chooses between the result of Raster Operation Logic Unit 1 and operand D. Selection Unit 2 chooses between the result of Raster Operation Logic Unit 2 and operand $D_F$. The outputs of the selection units are the new values for the destination (D') and destination filter ($D_F$'). These outputs of the

TABLE 8

Comparison of Cooperative Filter/Raster Operation Model with the Traditional Model.

| | Cooperative Filter/Raster Operation Model | Traditional Model |
|---|---|---|
| Number of transparency modes | All possible logical combinations of all operands. | Four |
| Storage | Filters are 1 bit in depth. | Transparency operands are of the same depth as raster operation operands. |
| Software performance | Since filters are 1 bit in depth, filter operations can be computed very efficiently in software. The raster operation for a given pixel need only be computed if the output of the filter for the pixel is "colored". | The depth of the transparency operand has impact on software performance. |
| Hardware complexity | Since filter and raster operations are inputs into the algorithm and are driven by truth value tables, one hardware circuit satisfies all possible transparencies (for a fixed limit on number of operands). | A new transparency mode requires a new algorithm or complex formula. If one has a hardware circuit with 4 transparency modes and wishes to add another, a new circuit is required. |
| Hardware performance | The hardware performance is the same independent of the filter operation. The three operation units may be executed in parallel. The volume of data, since filter depth is minimized, is low. | The performance will vary according to raster operation and transparency mode due to varying complexities in the transparency formulae. | selection units replace the respective pixels in the destination raster graphics data and the destination filter.

Advantages Versus The Traditional Model

Table 8 lists the major advantages of the cooperative filter and raster operation model as compared to the traditional model.

Preferred Hardware Circuit

Figure 5:
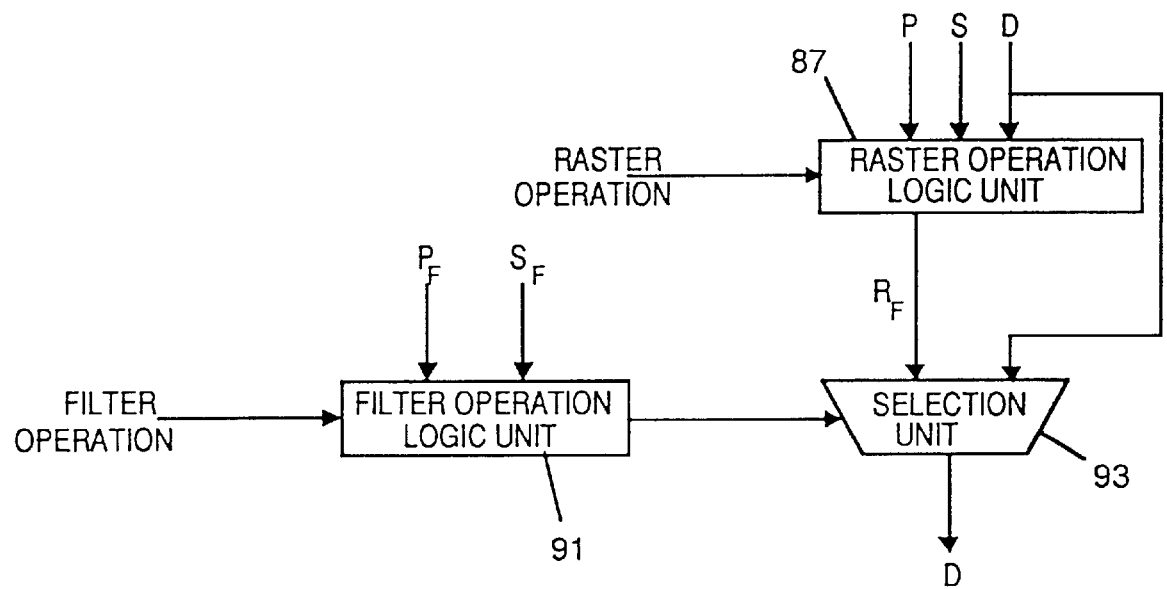
FIG. 5 is a block diagram of a circuit for implementing the preferred embodiment of the cooperative evaluation algorithm for two operands.

It should be noted that a model has been described which generalizes the notion of transparency by use of filters over three operands. Like raster operations, this model is extensible to any number of arguments in a trivial fashion. In the preferred embodiment, two is chosen because the devices the preferred circuit operates on are typically printing and display devices. Since the applications used to generate data input to these devices normally employ transparency only upon patterns and sources, the preferred embodiment only includes these. This is shown in FIG. 5.

Since the destination filter is not included in the preferred embodiment, i.e., the filter operation only accepts two operands, the maintenance of the destination filter is unnecessary in the preferred circuit. So, raster operation logic unit 87 is present, but the second raster operation logic unit is not present, and the inputs and outputs associated with filter operation logic unit 75 which results in are eliminated which results in filter operation logic unit 91. Selection unit 93 is a multiplexor like selection unit 1 or selection unit 2 (elements 81 and 83) in FIG. 4.

This model provides for 16 filter operations. To determine the filter operation, construct a table of the possible combinations of two operands as shown in Table 9. This table is much like the table for three operands in Table 7. Table 9 has four columns which represent the four possible combinations of pixels from two, pattern and source, filters.

TABLE 9

2-Operand logic table to determine a filter operation.

| Operand | Data Values |
|---|---|
| $P_F$ | 1100 |
| $S_F$ | 1010 |
| filter operation | desired result |

For example, suppose the desired filter is "only apply the raster operation to pixels that correspond to colored source pixels." This uses the first and third columns, from the left, in the table: "11" and "01". One can write these as "$(P_F \, \& S_F) | (\sim P_F \, \& S_F)$".

This is equivalent to "S" which is a sufficient filter operation for transparency mode TO.

Conclusion

The present invention provides a novel approach to simultaneously handling transparency operatives along with raster operations in a graphics environment. This is achieved by introducing filters and filter operations. These are used to determine the effect of transparency separately from the evaluation of raster operations. This is significantly different than traditional prior art approaches which attempt to combine these two forms of logic into a single operation.

Algorithm 3 is defined which is a cooperative evaluation model for filters and raster operations. These operations may be computed independently of one another. The cooperation lies in the fact that the results of both are used together to determine the final result. In fact, the result of the filter operation determines what value is output, whereas the raster operation provides one of the values that may be output.

The invented model generalizes transparency via filter operations to any number of operands, preferably all operands that may affect the destination. This is in contrast to traditional models which only consider a subset of the operands as transparency factors. Further, the invented model is such that one algorithm handles all cases. This is because the transparency or filter operation is a logic operation input to the algorithm. This is significantly different than traditional approaches which customize an algorithm for each transparency mode.

As a consequence of the invented model and given a fixed set of inputs and two destination outputs, raster and filter, it is possible to specify a general purpose circuit which may handle any filter and raster operation pair. This diagram is shown for three inputs in FIG. 3. Because the preferred embodiment is the current display and printer environment, and because the applications which provide inputs to these typically only use source and pattern transparency, a preferred embodiment is shown in FIG. 4 that allows three raster graphics operands and two filters. Should the application environment of the future generalize transparency as described herein, the invented approach is well and uniquely suited to support that generalization as well.

We claim:

1. An apparatus for creating an image which includes graphics information for display, said apparatus receiving graphics language commands which define the image to be displayed and generating a set of graphics orders from the graphics language commands representing the image to be displayed, said apparatus comprising:

an image generator means for generating a bitmap image from said graphics orders, said graphics orders including transparency information orders, said image generator means including a raster operation model for processing multiple-bit pixels in a source, in a pattern and in a destination, and a filter operation model for processing multiple-bit pixels in said source, in said pattern and in said destination, said raster operation model and said filter operation model operating cooperatively to modify said destination in a predetermined manner.

2. The apparatus defined by claim 1 wherein said raster operation model and said filter operation model comprises:

a) a raster operation logic unit which receives as one input a predetermined raster operation defining a logical operation to be performed on a pattern input, a source input and a destination input to generate a raster operation result;

b) a filter operation logic unit which receives as one input a predetermined filter operation defining a logical operation to be performed on a filter pattern input and a filter source input to generate a filter operation result;

c) a selection unit means coupled to said raster operation logic unit and said filter operation logic unit for selecting between said raster operation result and said destination input to said-raster operation logic unit based on said filter operation result.

3. The apparatus defined by claim 2 wherein the selection unit means comprises a multiplexor.

4. The apparatus defined by claim 1 wherein said raster operation model and said filter operation model comprises:

a) a first raster operation logic unit which receives as one input a predetermined raster operation defining a logical operation to be performed on a first pattern input, a first source input and a first destination input to generate a raster operation result;

b) a second raster operation logic unit which receives as one input said predetermined raster operation defining a logical operation to be performed on a filter pattern input, a filter source input and a filter destination input to generate a raster operation result;

c) a filter operation logic unit which receives as one input a predetermined filter operation defining a logical operation to be performed on said filter pattern input, said filter source input and said filter destination input to generate a filter operation result;

d) a first selection unit means coupled to said first raster operation logic unit and said filter operation logic unit for selecting between said raster operation result and said destination input to said first raster operation logic unit based on said filter operation result;

e) a second selection unit means coupled to said second raster operation logic unit and said filter operation logic unit for selecting between said second raster operation result and said filter destination input to said second raster operation logic unit based on said filter operation result.

5. The apparatus defined by claim 4 wherein the first selection unit means comprises a multiplexor.

6. The apparatus defined by claim 4 wherein the second selection unit means comprises a multiplexor.

7. The apparatus defined by claim 1 wherein said raster operation model comprises:

a set of Boolean operands defining a raster operation for each of said source, said pattern and said destination, each of said Boolean operands in said set having a corresponding colored raster graphics object wherein said raster operation is a pixel operation applied to each set of pixels of at least one equally sized raster arathics object operand.

8. The apparatus defined by claim 7 wherein said filter operation model comprises:

a set of Boolean operands defining a filter operation for each of said source, said pattern and said destination, each of said Boolean operands in said set having a corresponding colored raster graphics object wherein said filter operation is used to determine which outputs of said raster operation are applied to the destination, and when said filter operation yields a true value the associated output of the raster operation is applied to a corresponding destination pixel, and when said filter operation yields a false value the corresponding destination pixel is unchanged.

9. The apparatus defined by claim 1 wherein said filter operation model comprises:

a set of Boolean operands defining a filter operation for each of said source, said pattern and said destination, each of said Boolean operands in said set having a corresponding colored raster graphics object wherein said filter operation is used to determine which outputs of a raster operation are applied to the destination, and when said filter operation yields a true value the associated output of the raster operation is applied to a corresponding destination pixel, and when said filter operation yields a false value the corresponding destination pixel is unchanged.

10. A method for creating an image which includes graphics information for display comprising the steps of:

a) receiving graphics language commands which define the image to be displayed;

b) generating a set of graphics orders from the graphics language commands representing the image to be displayed;

c) generating a bitmap image from said graphics orders, said graphics orders including transparency information orders;

d) utilizing a raster operation model for processing multiple-bit pixels in a source, in a pattern and in a destination;

e) utilizing a filter operation model for processing multiple-bit pixels in said source, in said pattern and in said destination, f) operating said raster operation model and said filter operation model cooperatively to modify said destination in a predetermined manner.

11. The method defined by claim 10 wherein said raster operation model utilizing step and said filter operation model utilizing step comprise the steps of:

a) receiving a predetermined raster operation defining a logical operation to be performed on a pattern input, a source input and a destination input to generate a raster operation result;

b) receiving a predetermined filter operation defining a logical operation to be performed on a filter pattern input and a filter source input to generate a filter operation result;

c) selecting between said raster operation result and said destination based on said filter operation result.

12. The method defined by claim 11 wherein said raster operation model utilizing step comprises the steps of:

defining a raster operation for each of said source, said pattern and said destination using a set of Boolean operands, each of said Boolean operands in said set having a corresponding colored raster graphics object wherein said raster operation is a pixel operation applied to each set of pixels of at least one equally sized raster graphics object operand.

13. The method defined by claim 12 wherein said filter operation model utilizing step comprises the steps of:

defining a filter operation for each of said source, said pattern and said destination using a set of Boolean operands, each of said Boolean operands in said set having a corresponding colored raster graphics object wherein said filter operation is used to determine which outputs of said raster operation are applied to the destination, and when said filter operation yields a true value the associated output of the raster operation is applied to a corresponding destination pixel, and when said filter operation yields a false value the corresponding destination pixel is unchanged.

14. The method defined by claim 10 wherein said raster operation model utilizing step and said filter operation model utilizing step comprise the steps of:

a) receiving a predetermined raster operation defining a logical operation to be performed on a first pattern input, a first source input and a first destination input to generate a raster operation result;

b) receiving said predetermined raster operation defining a logical operation to be performed on a filter pattern input, a filter source input and a filter destination input to generate a raster operation result;

c) receiving a predetermined filter operation defining a logical operation to be performed on said filter pattern input, said filter source input and said filter destination input to generate a filter operation result;

d) selecting between said raster operation result and said destination based on said filter operation result;

e) selecting between said second raster operation result and said filter destination based on said filter operation result.

* * * * *

UNITED STATES PATENT AND TRADEMARK OFFICE
CERTIFICATE OF CORRECTION

PATENT NO.: 6,046,748
DATED: April 4, 2000
INVENTOR(S): Horowitz et al.

It is certified that error appears in the above-identified patent and that said Letters Patent is hereby corrected as shown below:

In column 2, at lines 4, 7, 9, 12, 16-17, 23-24, 31, and 35, delete "U.S. Pat. No. 5,204,804" and insert -- U.S. Pat. No. 5,502,804 --.

In column 11, at line 55, delete "U.S. Pat. No. 5 5,204,804" and insert -- U.S. Pat. No. 5,502,804 --.

In column 19, in claim 2, at line 35, delete "input to said-raster operation" and insert -- input to said raster operation --.

In column 20, in claim 7, at line 12, delete "raster arathics" and insert -- raster graphics --.

Signed and Sealed this

First Day of May, 2001

Attest:

NICHOLAS P. GODICI

*Attesting Officer*  *Acting Director of the United States Patent and Trademark Office*